(12) United States Patent
Kim et al.

(10) Patent No.: US 7,784,845 B2
(45) Date of Patent: Aug. 31, 2010

(54) EXPANDABLE VEHICLE-MOUNTED SHELTER

(75) Inventors: Baekhee Kim, Gyeonggi-do (KR); Wanyong Rha, Gyeonggi-do (KR)

(73) Assignee: Mirae S&T Inc., Gyeonggi-Do (KR)

( * ) Notice: Subject to any disclaimer, the term of this patent is extended or adjusted under 35 U.S.C. 154(b) by 205 days.

(21) Appl. No.: 12/148,558

(22) Filed: Apr. 21, 2008

(65) Prior Publication Data

US 2008/0264463 A1    Oct. 30, 2008

(30) Foreign Application Priority Data

Apr. 27, 2007    (KR) ........................ 10-2007-0041076

(51) Int. Cl.
*B60P 3/34* (2006.01)
(52) U.S. Cl. ........................ 296/26.01; 52/79.5; 52/71
(58) Field of Classification Search ............. 296/26.01, 296/165, 159, 164; 52/169.6, 71, 79.1, 109, 52/79.5, 641, 646
See application file for complete search history.

(56) References Cited

U.S. PATENT DOCUMENTS

| | | | | | |
|---|---|---|---|---|---|
| 1,461,574 | A | * | 7/1923 | Caplan | 296/169 |
| 2,832,637 | A | * | 4/1958 | Decosse | 296/26.15 |
| 3,107,116 | A | * | 10/1963 | Meaker | 296/171 |
| 3,271,065 | A | * | 9/1966 | Scuris | 296/26.02 |
| 3,469,356 | A | * | 9/1969 | White | 296/26.15 |
| 4,294,484 | A | * | 10/1981 | Robertson | 296/156 |
| 4,534,141 | A | * | 8/1985 | Fagnoni | 52/68 |
| 4,689,924 | A | * | 9/1987 | Jurgensen | 52/67 |
| 5,345,730 | A | * | 9/1994 | Jurgensen | 52/64 |
| 5,966,956 | A | * | 10/1999 | Morris et al. | 62/259.1 |
| 5,971,471 | A | * | 10/1999 | Gardner | 296/26.13 |
| 6,135,525 | A | * | 10/2000 | Amann | 296/26.11 |
| 6,217,106 | B1 | * | 4/2001 | Reckner, Jr. | 296/173 |
| 6,223,479 | B1 | * | 5/2001 | Stockli | 52/68 |
| 6,712,414 | B2 | * | 3/2004 | Morrow | 296/26.01 |
| 6,983,567 | B2 | * | 1/2006 | Ciotti | 52/79.5 |
| 7,117,645 | B2 | * | 10/2006 | Bzorgi | 52/79.5 |
| 7,418,802 | B2 | * | 9/2008 | Sarine et al. | 52/79.5 |
| 2006/0101729 | A1 | * | 5/2006 | Waters | 52/79.5 |
| 2007/0107321 | A1 | * | 5/2007 | Sarine et al. | 52/71 |
| 2009/0044460 | A1 | * | 2/2009 | Medley | 52/71 |
| 2009/0217600 | A1 | * | 9/2009 | De Azambuja | 52/79.5 |

* cited by examiner

*Primary Examiner*—Kiran B. Patel
(74) *Attorney, Agent, or Firm*—Daniel P. Burke & Associates, PLLC

(57) ABSTRACT

An expandable vehicle-mounted shelter is a construction connected to a vehicle, in which a shelter container body 2 thereof is laterally enlarged to have an enlarged internal space in which special equipment, such as communication equipment, medical equipment, etc., and other equipment is provided, or otherwise to be utilized as a compartment for carrying goods. In the shelter container body, expandable frames are laterally oppositely provided, each frame having folding sections. In each of the folding sections, a support plate is pivotably connected, at the upper or lower end thereof, to the body via hinge means, and at least one folding plate is foldably connected to the support plate, so that the folding section can be pivoted around the hinge means to spread out, thereby enlarging the space inside the shelter.

8 Claims, 8 Drawing Sheets

EXPANDABLE VEHICLE-MOUNTED SHELTER

BACKGROUND OF THE INVENTION

1. Field of the Invention

The present invention relates, in general, to an expandable vehicle-mounted shelter and, more particularly, to an expandable vehicle-mounted shelter, in which internal expandable frames are pulled out and unfolded from a folded state thereof in both lateral directions of a shelter body to thereby enlarge the internal space and maximize the usefulness of the space, and in which the operations of pulling in and out the expandable frames are easily carried out using a simple structure.

2. Description of the Related Art

Generally, a vehicle-mounted shelter 1, as shown in FIG. 1, is used in diverse ways, that is, has therein special equipment, such as communication devices, medical devices, etc., and other equipment according to the intended purpose.

Alternatively, the shelter may be utilized as a compartment for carrying goods.

Such a shelter may be used in diverse ways while being transported by a vehicle, and can be effectively used with a rear side or lateral sides thereof open according to the intended use.

Particularly, the shelter has recently been provided in an expandable type to enlarge the space therein so as to maximize the efficiency of use of space.

Such a conventional expandable type shelter is provided in diverse forms such that as shown in FIG. 2A, a shelter body 2 is provided so as to be openable in both lateral sides, and expandable frames 3, 3 are installed opposite each other so that they can be pulled out, by sliding, from the center of the shelter body 2.

The space inside the expandable type shelter is enlarged by pulling out the expandable frames 3, 3 in opposite directions, thereby realizing excellent use of space.

However, in the expandable type shelter, the expandable frames 3, 3 to be pulled out are inserted into the shelter body in the state in which they are separated from each other and are placed on opposite sides. Accordingly, there is a problem in that there is a limit on the extent to which the space can be enlarged using the expandable frames 3, 3.

That is, the expansion of the internal space using the expandable frames 3, 3 is restricted.

Further, since the expandable frames 3, 3 have a slidable structure so as to be pulled out from the opposite sides of the shelter body 2, it is not easy to push the expandable frames in or pull them out due to considerable friction resistance.

To overcome the above problems, as shown in FIG. 2B, there has been disclosed an expandable vehicle-mounted shelter in which expandable frames 4, 4' are oppositely inserted so that one overlaps another in the shelter body 2 such that they can be slidably pushed in and pulled out with relative ease.

Compared to the construction shown in FIG. 1, such a shelter has a bigger internal space because the expandable frames 4, 4' can be pulled out further from the opposite sides of the shelter body 2.

Since the expandable frames 4, 4', however, have an overlapping insertion structure, problems arise in that the bottom of the internal space defined by the expandable frames 4, 4' has a step, which restricts the use of the space, and in that the expandable frames 4, 4' have a larger area in which friction acts during the process of pushing them in and pulling them out, further hindering the operation of pushing in and pulling out the expandable frames.

SUMMARY OF THE INVENTION

Accordingly, the present invention has been made keeping in mind the above problems occurring in the related art, and the present invention is intended to propose an expandable vehicle-mounted shelter in which internal folding frames are pulled out and unfolded from a folded state thereof toward opposite lateral directions of a shelter body to thereby enlarge the internal space and maximize the utility of the space, and in which the operations of pushing in and pulling out the folding frames are easily carried out using a simple structure.

Another object of the present invention is to propose an expandable vehicle-mounted shelter in which airtightness is imparted to the folded portion of the folding frames, and a bottom plate is provided to the bottom of the space inside the pulled-out portion of the frames to prevent the formation of a step, thereby providing excellent efficiency of use.

In order to achieve the above objects, according to one aspect of the present invention, there is provided an expandable vehicle-mounted shelter connected to a vehicle, comprising a shelter container body laterally enlargeable to have an enlarged internal space, wherein expandable frames are laterally and oppositely provided in the shelter container body, each frame having a folding section, which includes a support plate pivotably connected, at the upper or lower end thereof, to the body via hinge means, and at least one folding plate foldably connected to the support plate, so that the folding section pivots around the hinge means to spread out, thereby enlarging the space inside the shelter.

Further, the present invention has a characteristic in that the folding section is provided so that the support plate and the folding plate are foldably connected together by means of a hinge, in that the support plate and the folding plate are provided at their contacting ends with airtight packings, and in that a groove is formed in one of the airtight packings and a corresponding protrusion is formed on the other one of the airtight packings.

Further, the present invention has a characteristic in that a bottom plate is provided inside the expandable frame so as to be foldable at its lower end from a vertical position to a horizontal position.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
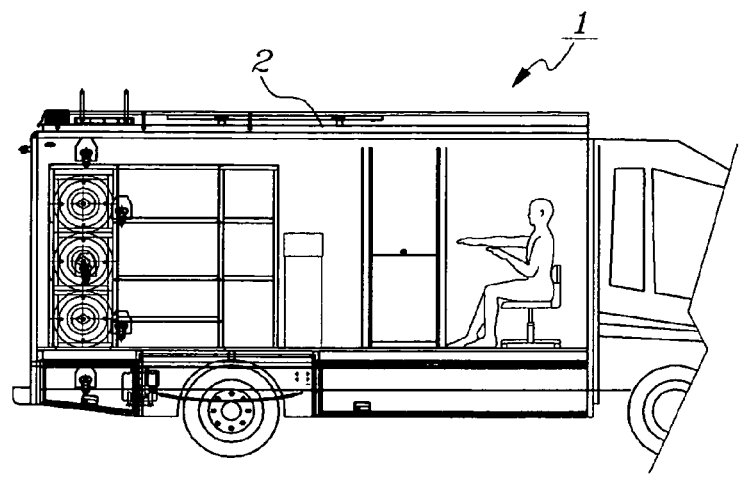
FIG. 1 is a front view illustrating a vehicle having a conventional shelter container.
Figure 2A:
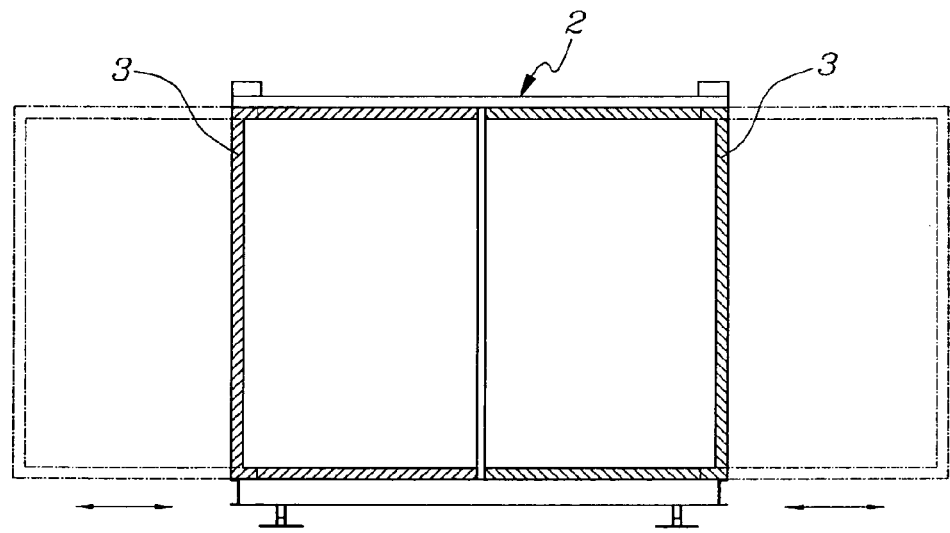
FIGS. 2A and 2B are side cross-sectional views illustrating various embodiments of a conventional shelter container.
Figure 2B:
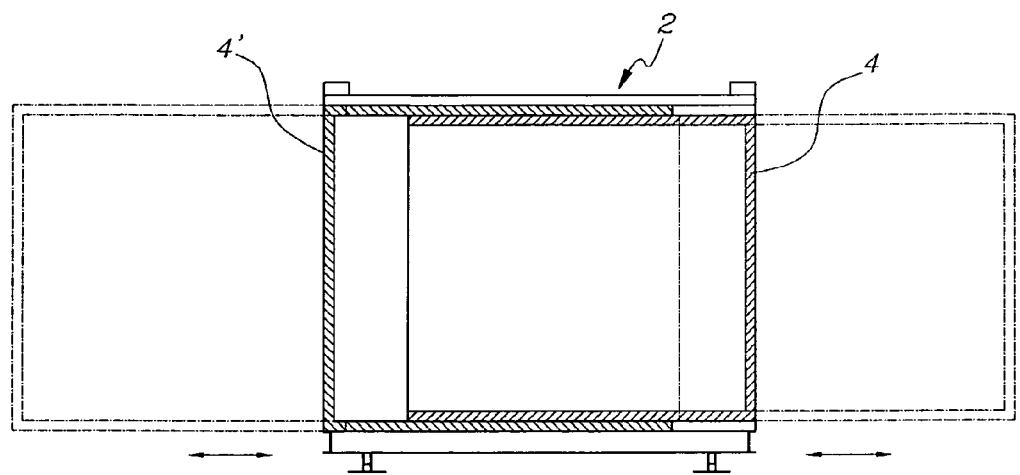
Figure 3:
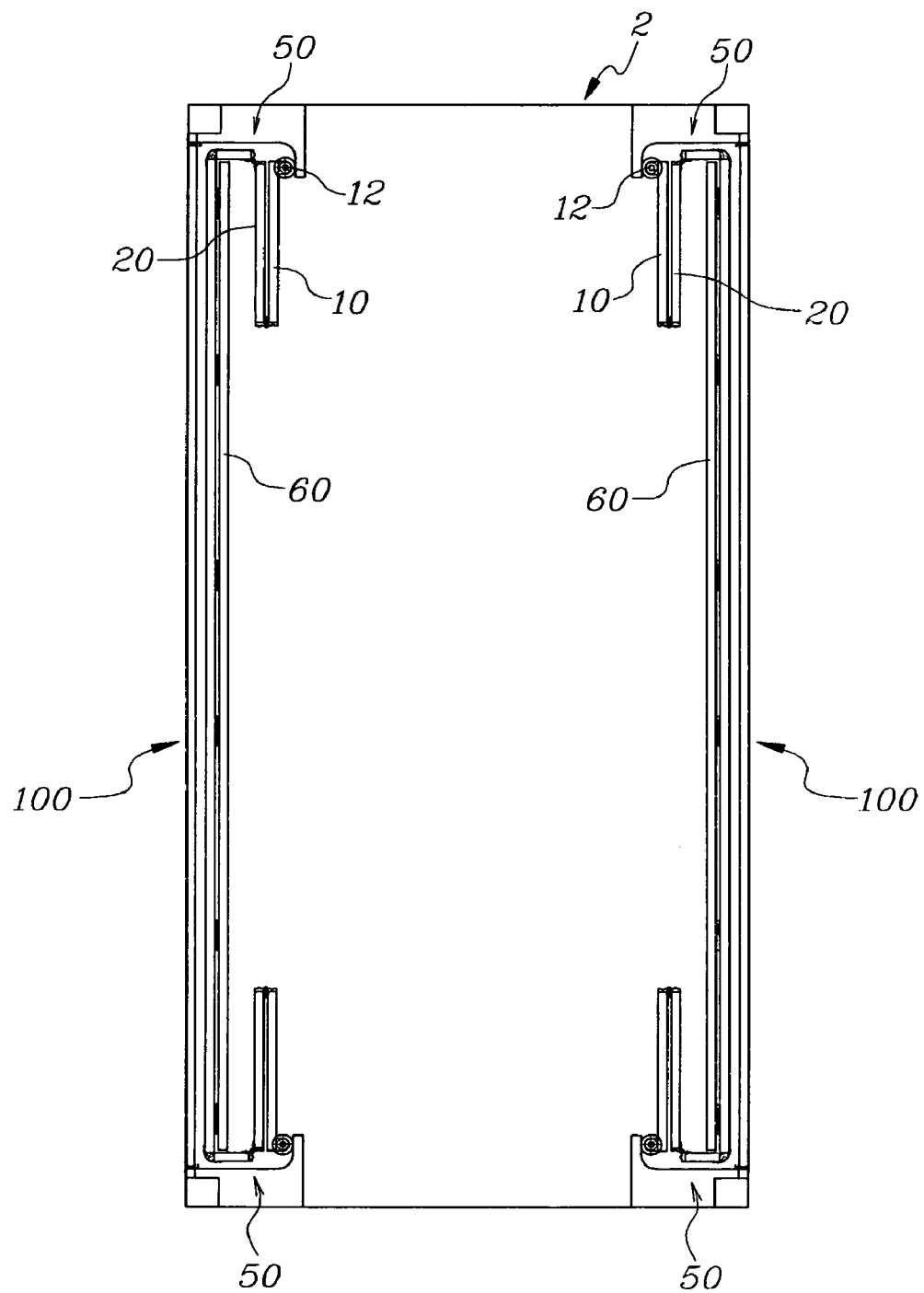
FIG. 3 is a planar cross-sectional view illustrating an expandable vehicle-mounted shelter according to the present invention.
Figure 4:
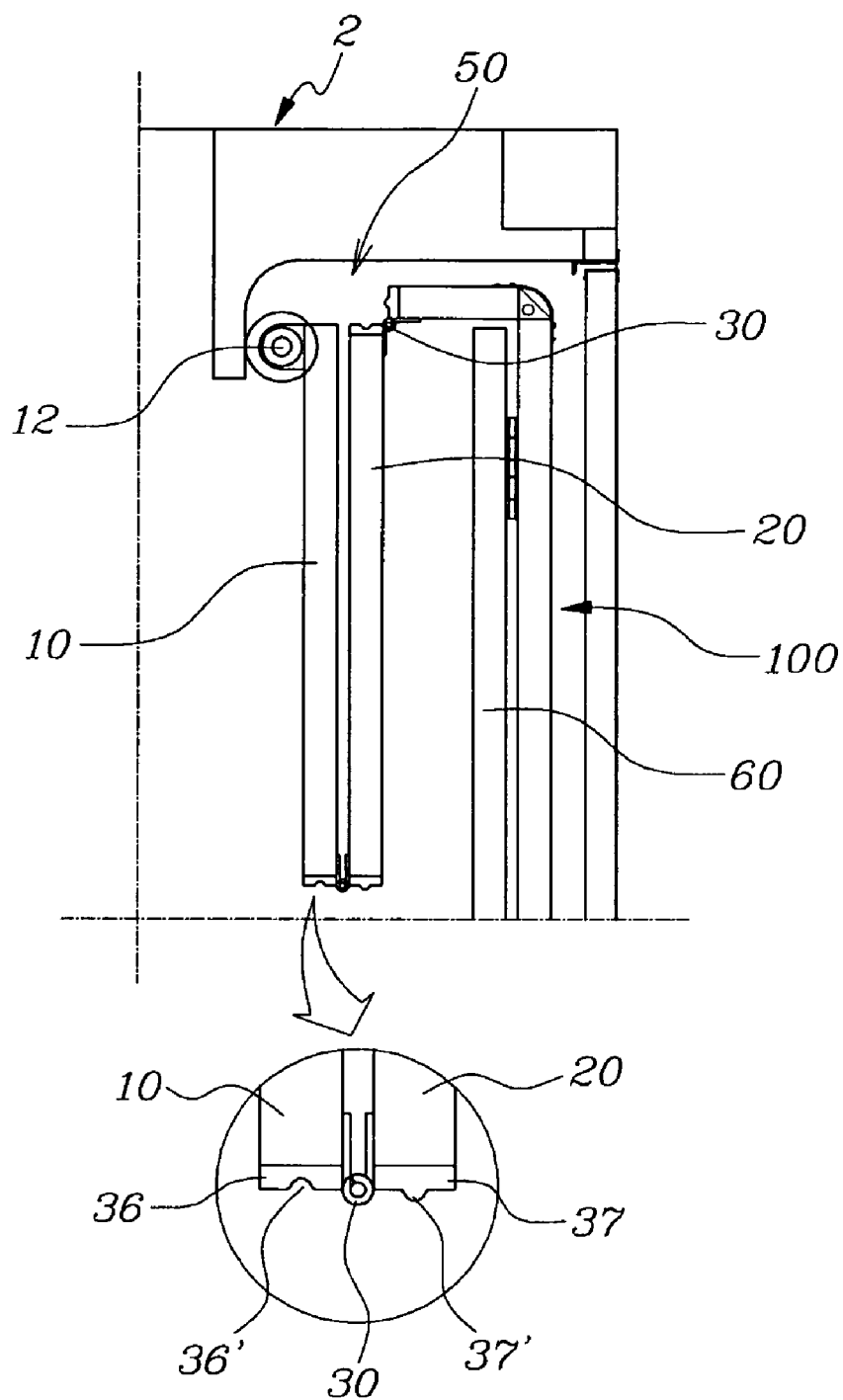
FIG. 4 is a partial enlarged view of important parts of FIG. 3.
Figure 5:
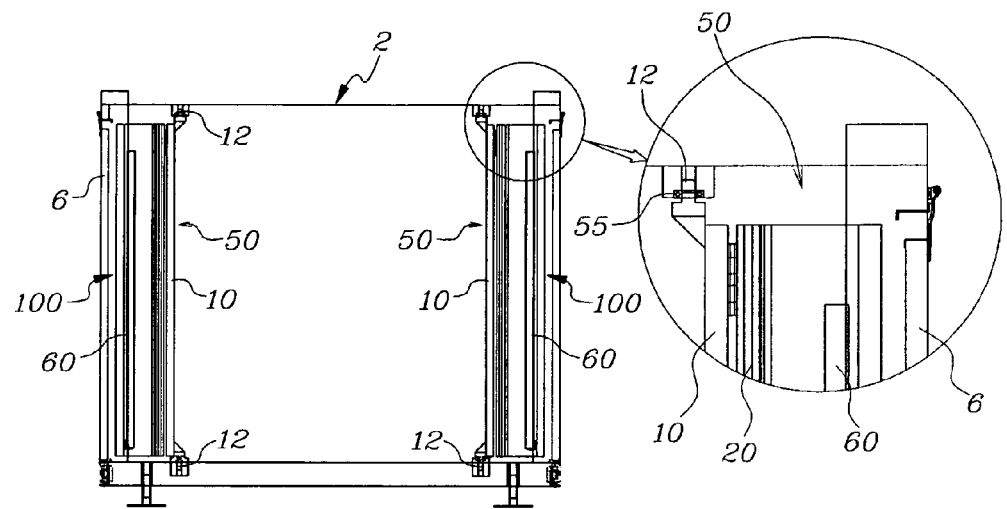
FIG. 5 is a side cross-sectional view illustrating the expandable vehicle-mounted shelter of the invention.
Figure 6:
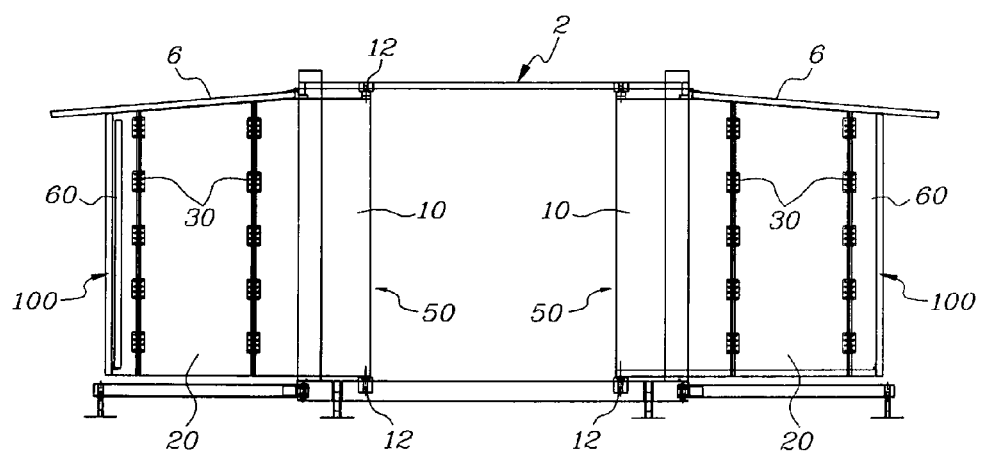
FIG. 6 is a side cross-sectional view illustrating the expandable vehicle-mounted shelter of the invention in an enlarged state.
Figure 7:
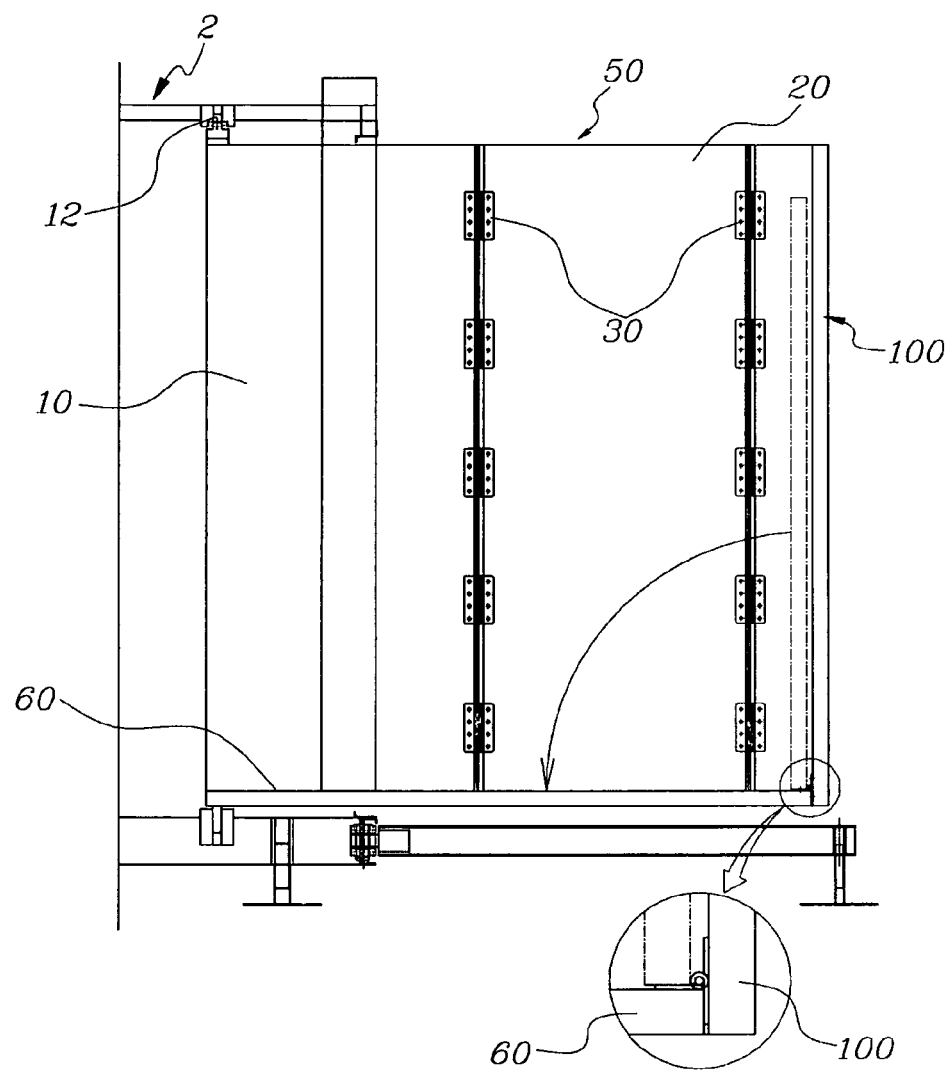
FIG. 7 is a partial enlarged view of FIG. 6.
Figure 8:
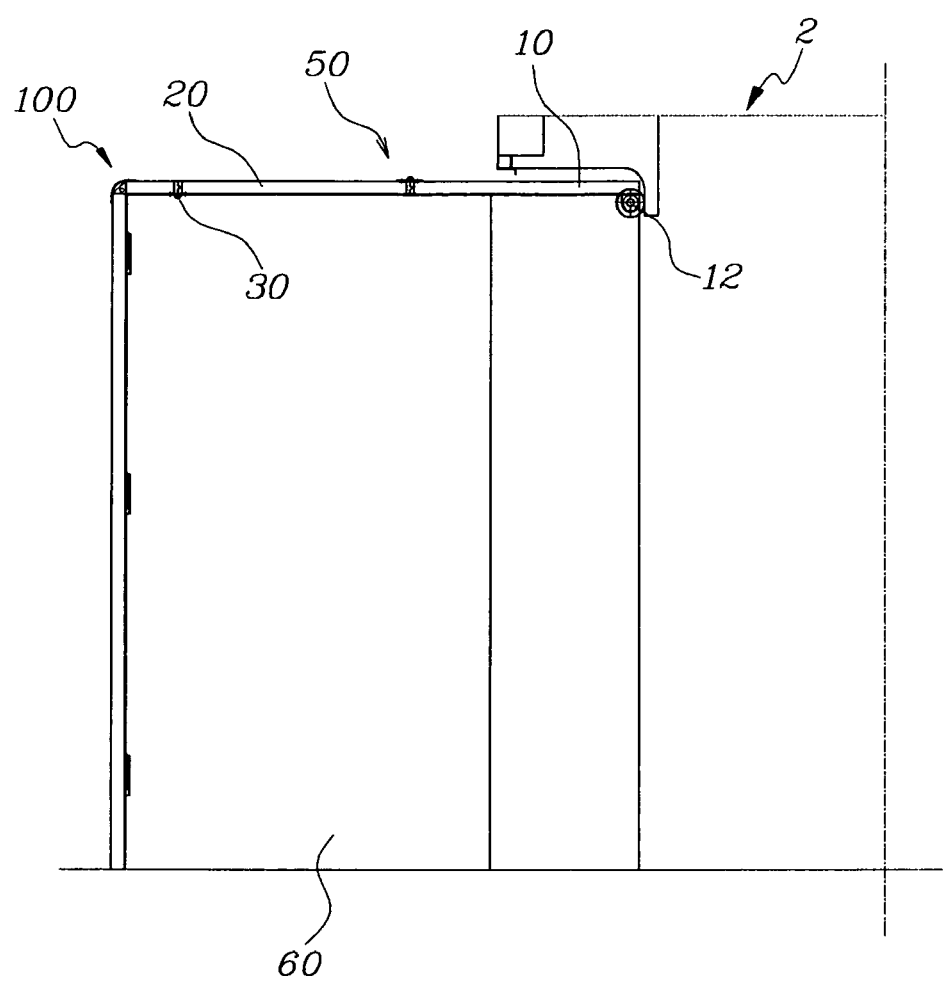
FIG. 8 is a partial plan view illustrating the expandable vehicle-mounted shelter of the invention in an enlarged state.

Reference will now be made in greater detail to exemplary embodiments of the invention, which are illustrated in the accompanying drawings. Wherever possible, the same reference numerals will be used throughout the drawings and the description to refer to the same or like parts.

An expandable vehicle-mounted shelter of the invention is shown in FIGS. 3 to 8.

The expandable vehicle-mounted shelter of the invention is a construction connected to a vehicle, in which a shelter container body 2 thereof is laterally enlarged to have an enlarged internal space in order to house special equipment, such as communication equipment, medical equipment, etc., and other equipment, or otherwise to be utilized as a compartment for carrying goods.

In the shelter container body 2, expandable frames 100 are laterally provided at opposite positions, each frame having folding sections 50. In each of the folding sections 50, a support plate 10 is pivotably connected, at the upper or lower end thereof, to the body 2 via hinge means 12, and at least one folding plate 20 is foldably connected to the support plate, so that the folding section 50 pivots around the hinge means 12 to spread out, thereby enlarging the space inside the shelter.

In the folding section 50, the support plate 10 and the folding plate 20 are foldably connected together by means of a hinge 30. Particularly, the support plate 10 is provided, at one end connected to the folding plate 20, with an airtight packing 36 having a groove 36' therein, and the folding plate 20 is provided, at one end connected to the support plate 10, with an airtight packing 37 having a protrusion 37' corresponding to the groove 36' in the airtight packing 36 of the support plate 10.

Further, the hinge means 12 of the folding section 50 is supported by a bearing 55 so as to minimize friction resistance upon pivoting.

Further, a bottom plate 60 is provided inside the expandable frame 100 so as to be foldable, at its lower end, from a vertical position to a horizontal position.

Further, an opening door 6 is provided at upper portions of both lateral sides of the shelter container body 2 so as to open and shut in upward and downward directions.

Now the operation of the construction of the present invention will be described.

The present invention has a characteristic in that the folding sections 50 of the expandable frames 100 operate to be folded/unfolded in lateral directions of the shelter container body 2 to effectively enlarge the space inside the shelter and in that the folding/unfolding operation of the folding section is easily carried out thanks to hinge pivoting.

To be specific, in the case where it is intended to enlarge the space inside the shelter, the opening doors 6 provided at both lateral sides of the container body 2 are opened upwards, and then the expandable frames 100, provided laterally in the container body 2, are pulled out using the operation of a separate cylinder, to thereby enlarge the internal space.

That is, upon the pulling-out of the expandable frames 100, the support plate 10, which is connected to the container body 2 via the hinge means 12 in both folding sections 50 of the expandable frame, is pivoted to unfold the plurality of folding plates 20 connected to the support plate 10 by means of hinges 30, to thereby enlarge the internal space.

Particularly, since the expandable frame 100 is spread out in a state in which the plurality of folding plates 20 is folded on the support plate 10, and is then pulled out laterally to the maximum, the expansion of the internal space is maximized.

Herein, on the contacting end faces between the support plate 10 and the respective folding plates 20, the airtight packings 36 and 37 respectively having a groove 36' and a protrusion 37' are engaged with each other, thereby providing excellent properties, such as airtight, windproof and soundproof functions.

Further, since the support plate 10 of the expandable frame 100 is simply pivoted while supported on a bearing (not shown) of the shelter container body 2 via the hinge means 12, thus overcoming the large friction resistance or area as in conventional slidable structures, to thereby unfold the folding section 50, the operation of pushing in and pulling out the expandable frame 100 is simply carried out.

Further, after the expandable frame 100 is pulled out, in order to make the bottom of the enlarged space flat, if needed, the bottom plate 60, which has been folded vertically on the inside of the expandable frame 100, is pivoted horizontally to provide the flat bottom.

Conversely, when the expandable frame 100, which has been pulled out to use the enlarged space inside the shelter container body 2, is to be returned to its original position, once the expandable frame 100 is simply pushed into the shelter container body 2 from its pulled-out state, the folding section 50 is folded and thus returned to its original position.

According to the expandable vehicle-mounted shelter of the present invention, due to the construction of the folding section 50 of the expandable frame 100, the efficiency of space enlargement of the shelter container body is maximized, and the operation of the folding section 50 for space enlargement is simply carried out.

Figure 9:
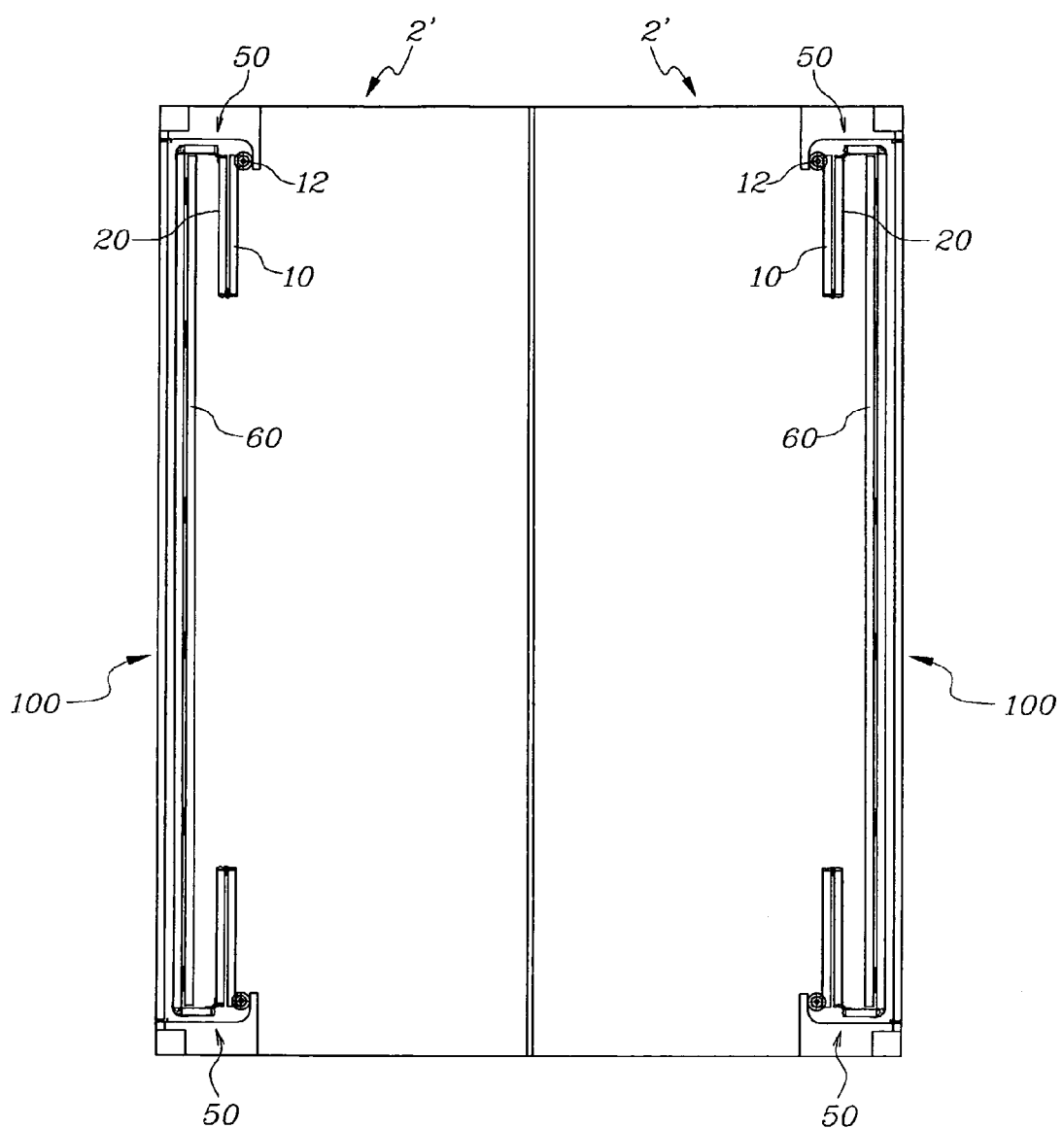
FIG. 9 is a planar cross-sectional view illustrating another embodiment of an expandable vehicle-mounted shelter of the invention.

Meanwhile, FIG. 9 illustrates another embodiment of an expandable vehicle-mounted shelter of the invention.

The above expandable vehicle-mounted shelter is a construction connected to a vehicle, in which construction a shelter container body 2 thereof is laterally enlarged to have an enlarged internal space in which special equipment, such as communication equipment, medical equipment, etc., and other equipment is provided, or which is otherwise utilized as a compartment for carrying goods.

The expandable vehicle-mounted shelter has a construction in which opposite shelter container bodies 2' are provided parallel to each other, each body having, on inner one side, an expandable frame 100 provided with a folding section 50, at least a folding plate 20 of which is foldably connected to a support plate 10, upper and lower portions of which are pivotably connected to the body 2 via hinge means 12.

A difference of this embodiment from the former embodiment is that the shelter container bodies 2' are provided parallel to each other, so that the expandable frames 100 provided on first sides of the respective shelter container bodies 2' are pulled out to enlarge the internal space.

The operation of pushing in and pulling out the expandable frame 100 is the same as in the former embodiment.

As set forth above, according to the expandable vehicle-mounted shelter of the present invention, the expandable frames are pulled out from a folded state using the folding section, so that the usefulness of space is maximized through space enlargement. Further, the support plate of the expandable frame is pivoted around the hinge means to thereby unfold the plurality of foldable folding plates, so that as compared to the conventional sliding type, which has problems of large frictional resistance and area, the operation of pushing the frame in and pulling it out is simply and conveniently carried out, thereby providing excellent convenience of use. Furthermore, the folded portions of the folding section are airtight, and the separate bottom plate is provided on the bottom of the enlarged internal space, thereby providing excellent efficiency of use.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An expandable vehicle-mounted shelter connected to a vehicle, comprising a shelter container body laterally enlargeable to have an enlarged internal space in order to house special equipment or to be utilized as a compartment for carrying goods;
wherein expandable frames are laterally oppositely provided in the shelter container body, each frame having a folding section, which includes a support plate pivotably connected, at an upper or lower end thereof, to the shelter container body via hinge means, and at least one folding plate foldably connected to the support plate, so that the folding section is pivoted around the hinge means to spread out, thereby enlarging an internal space of the shelter.

2. The expandable vehicle-mounted shelter as set forth in claim 1, wherein the folding section is provided so that the support plate and the folding plate are foldably connected together by means of a hinge.

3. The expandable vehicle-mounted shelter as set forth in claim 1, wherein, in the folding section, the support plate and the folding plate comprise contacting ends and are provided at their contacting ends with airtight packings, wherein a groove is formed in one of the airtight packings and a corresponding protrusion is formed on the other one of the airtight packings.

4. The expandable vehicle-mounted shelter as set forth in claim 1, wherein a bottom plate is provided inside the expandable frame so as to be foldable, at its lower end, from a vertical position to a horizontal position.

5. The expandable vehicle-mounted shelter as set forth in claim 1, wherein the hinge means of the folding section is supported by a bearing so as to minimize friction resistance upon pivoting.

6. The expandable vehicle-mounted shelter as set forth in claim 1, wherein an opening door is provided at upper portions of both lateral sides of the shelter container body so as to open and shut in upward and downward directions.

7. An expandable vehicle-mounted shelter connected to a vehicle, comprising a shelter container body laterally enlargeable to have an enlarged internal space in order to house special equipment, such as communication equipment and medical equipment, and other equipment, or be utilized as a compartment for carrying goods,
wherein a pair of the shelter container bodies is provided in parallel to be symmetric with each other, each body having an expandable frame on one inner side, the frame provided with a folding section, which includes a support plate pivotably connected, at an upper or lower end thereof, to the shelter container body via hinge means, and at least one folding plate foldably connected to the support plate, so that the folding section is pivoted around the hinge means to spread out, thereby enlarging an internal space of the shelter.

8. The expandable vehicle-mounted shelter as set forth in claim 2, wherein, in the folding section, the support plate and the folding plate comprise contacting ends and are provided at their contacting ends with airtight packings, wherein a groove is formed in one of the airtight packings and a corresponding protrusion is formed on the other one of the airtight packings.

* * * * *